(12) United States Patent
Wilson

(10) Patent No.: US 6,396,958 B1
(45) Date of Patent: May 28, 2002

(54) IMAGE TRANSMISSION SYSTEM AND METHOD EMPLOYING COMPRESSION AND ERROR CORRECTION

(75) Inventor: Dennis L. Wilson, Palo Alto, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/161,210

(22) Filed: Sep. 25, 1998

(51) Int. Cl.[7] .................................................. G06K 9/36
(52) U.S. Cl. ....................................... 382/246; 382/232
(58) Field of Search ................................. 382/244, 245, 382/246, 247, 248, 249, 250, 251, 232, 233, 252; 348/404, 405, 406, 408, 419; 375/341, 316, 340, 295, 259, 240.27, 240.28; 341/94

(56) References Cited

U.S. PATENT DOCUMENTS

| | | | | |
|---|---|---|---|---|
| 5,335,016 A | * | 8/1994 | Nakagawa | 348/405 |
| 5,339,108 A | * | 8/1994 | Coleman et al. | 348/408 |
| 5,452,104 A | * | 9/1995 | Lee | 358/433 |
| 5,481,566 A | * | 1/1996 | Kulesa | 375/259 |
| 5,751,865 A | * | 5/1998 | Micco et al. | 382/296 |
| 5,883,979 A | * | 3/1999 | Beretta et al. | 382/251 |

\* cited by examiner

*Primary Examiner*—Phuoc Tran
*Assistant Examiner*—Amir Alavi
(74) *Attorney, Agent, or Firm*—Kenneth W. Float

(57) ABSTRACT

A system and method that introduces intentional errors into a compression scheme for images. The intentionally introduced errors along with error correction processing enable improved low entropy encoding of the images. The errors transmitted over a communication channel are reduced by adding an error correction code to the transmitted data. In an exemplary system and method, an image is blocked to create a plurality of pixel blocks. The blocked image is transform coded and quantized to quantize transform coefficients. The image is low entropy coded. The image is error correction coded to improve communication through a communication channel that introduces errors. The entropy coded coefficients are truncated to introduce intentional errors into the image that is communicated over a communication channel. Upon reception, blocks of the received image are expanded to produce entropy coded coefficients, which are error correction decoded. The error correction decoded entropy coded coefficients are low entropy decoded to produce quantized transform coefficients. The quantized transform coefficients are inverse quantized to produce the plurality of transform coefficients. The transform coefficients are inverse transformed to produce the plurality of image blocks. Finally, the plurality of image blocks are unblocked to produce the transmitted image.

11 Claims, 2 Drawing Sheets

IMAGE TRANSMISSION SYSTEM AND METHOD EMPLOYING COMPRESSION AND ERROR CORRECTION

BACKGROUND

The present invention relates generally to communication systems and methods, and more particularly, to an image compression technique for use with image transmission or communication systems and methods that employs low entropy coding of images and error correction.

Image compression techniques have used several schemes to reduce the number of bits required to store or transfer images. When the images are sent over a communication link there is a possibility of introducing errors.

One technique for compressing images is a transform compression scheme. One transform used in many applications is a discrete cosine transform. Another transform that is used is a wavelet transform. The compression process begins by organizing an image into blocks that are convenient for the transform. For JPEG images, the transform is an 8×8 discrete cosine transform. The result of the image transformation is that most of the energy in the image is captured in low frequency elements of the transform.

The quantization of the transform values introduces errors in the reconstructed image and reduces the information in the image. The amount of the quantization and the technique for quantizing establishes many parameters of the compression. A typical technique involves weighting the transform values according to the frequency, then rounding the transform values to form integers. While truncation may be used, good practice uses rounding since it reduces the amount of the error.

Entropy encoding attempts to use long code words for rare image transform values and very short code words for image transform values that occur often. If the transform matches the image well, the bulk of the energy of the image is captured in a few of the coefficients in a block. The remainder of the coefficients are zero or nearly zero. Since so many quantized coefficients are zero or nearly zero, these coefficients are assigned code values that are very short.

The entropy coded coefficients are typically ordered by the "frequency" associated with the coefficient. For JPEG lossy compression, the ordering from low frequency to high frequency selects the coefficients in a zigzag pattern over a rectangular array of coefficients that are the output of the transform. The ordering is important, since it organizes the low frequency coefficients where much of the information of the image is concentrated first and leaves the low information, or "low entropy", coefficients until last.

The low entropy portion of the image is a part of the image where many of the values of the quantized transform are the same or nearly the same. The higher frequency coefficients of the quantized transform have many values that are zero or nearly zero, corresponding to the low entropy portion of the image. If the entropy encoding is restricted to encoding the coefficients one at a time, the smallest number of bits per pixel is one.

The number of bits for the low entropy portion of the quantized transform can be strongly reduced by using "run length encoding". When there are many values in a row that are zero, the run of zeroes may be replaced by a special code word followed by the number of zeroes in the string. In this way, a few bits may be used to represent large numbers of pixels in the low entropy part of the image.

With run length encoding, the number of bits per pixel may be reduced to less than one on the average. An image that uses 10 bits per pixel for the image values may be compressed 20:1 to one half bit per pixel on the average. For a large class of images, 20:1 compression yields very pleasing restored images.

An alternative scheme for entropy encoding was suggested by Said and Pearlman in "A new, fast, and efficient image codec based on set partitioning in hierarchical trees," IEEE Trans on Circuits and Systems for Video Technology, Vol. 6, No. 3, June 1996, page 243–250. The quantized transform is first organized by "zero tree" association of the transform values. This association starts with the lowest frequency coefficient and for each coefficient associates the higher frequency coefficients for that location on the image. Since the wavelet transform usually has a 2:1 downsample between levels, each coefficient at the lowest frequency has four coefficients in each of the three next higher frequency set of coefficients associated with the same point. The zero tree ordering of the coefficients results in a natural ordering of the coefficients by frequency. The ordering is important for the Said and Pearlman approach to compression. An alternative for the wavelet transform is to transmit each of the blocks of frequency coefficients independently, starting with the lowest frequency block.

The quantized transform is organized by bit planes. The most significant bit of each quantized transform coefficient in a block is encoded first. In an area where there is much energy, many of the bits may be ones. If the quantized transformed values are organized by frequency, this area is the low frequency parts of the quantized transform.

The higher frequency areas of the high order bits are almost all zero. The result is an ideal application of run length coding. The bit plane for the block is transmitted by sending the first part of the block, then sending the end of the block using run length coding when there are no more ones in the bit plane. The next bit plane is similarly encoded by sending the bits of the bit plane ordered by frequency until there are no more ones in the bit plane, then sending a run length coded string of zeroes.

This technique can be controlled to achieve a given signal-to-noise ratio or a given compression ratio for each block by terminating the bit plane compression at a convenient point depending on the attribute desired. The remainder of the bits are not sent, corresponding to an effective quantization of the image.

When the image is sent through a communication channel, bit errors may be introduced. Bit errors cause the entropy decoder to lose synchronization with the data stream. Until synchronization is reestablished, there are a large number of pixels that are decoded in error. The decoder is typically re-synchronized by adding special markers to the beginning of a line or the beginning of a block. Many fewer lines or blocks will be in error if the transmission scheme reduces the number of transmission errors to a small value. This is achieved by the present invention. At the same time, it would also be desirable to use error correction to improve the image compression by improving the low entropy coding.

From the above, it can be seen that previous techniques use a relatively inefficient run length coding technique for low entropy coding that has minimal resistance to errors in communication. Therefore, it would be an improvement to have image transmission system and method comprising an image compression technique that uses error correction to reduce errors in communication over a communication channel while improving the compression of the image.

SUMMARY OF THE INVENTION

To meet the above and other objectives, the present invention provides for a system and method that introduces intentional errors into a compression scheme for images. The intentional errors along with error correction processing enable much improved low entropy encoding of the images. The error correction also serves to reduce the errors in transmission over a communication channel. Furthermore, the present invention uses error correction to improve the compression by improving the low entropy coding.

The system and method compresses images and performs error correction on images that are transmitted through the communication channel that introduces errors into the transmitted data. The present invention thus provides for a technique that improves low entropy coding of images by using an error-correction encoding.

More particularly, the present invention provides for an image transmission system and method. In the system and method an image is blocked to create a plurality of image blocks. The image blocks are transform coded to produce a plurality of transform coefficients. The transform coefficients are quantized. The quantized transform coefficients are entropy coded. In accordance with the principles of the present invention, the entropy coded quantized transform coefficients are error correction coded, and the entropy coded coefficients are truncated to introduce intentional errors into the image that is to be communicated.

The image is then transmitted through a communication channel. In accordance with the principles of the present invention, blocks of the received image are expanded to produce entropy coded coefficients with possible communication errors. The entropy coded coefficients are error correction decoded to produce corrected entropy coded coefficients. Errors corrected are errors introduced by the communication path and errors introduced to make low entropy encoding more efficient. The error correction decoded image blocks are entropy decoded to produce the quantized transform coefficients. The quantized transform coefficients are then inverse quantized to produce the plurality of transform coefficients. The plurality of transform coefficients are inverse transformed to produce the plurality of image blocks. Finally, the plurality of image blocks are unblocked to produce the transmitted image.

Error correction in accordance with the present invention is preferably used in an image transmission system to communicate through a communication channel that introduces errors. The error correction is used to improve the quality of the communicated data. The error correction adds bits to the communication data stream. A scheme that may be used in many applications is a Bose Chaudhuri Hocquenghem encoder. A related encoder is a Reed Solomon encoder. The encoder adds a number of bits or symbols to a block of data to be encoded. An example Reed Solomon encoder adds 24 bytes to a block of 231 bytes to reduce the error rate for a communication channel from $10^{-3}$ to $10^{-8}$. The number of bytes added is about 10% of the number of bytes that are encoded.

For compression, the addition of the error correction typically reduces the effective compression by 10%. Instead of achieving 0.5 bits per pixel for 20:1 compression of a 10 bit image, the number of bits per pixel is close to 0.55. Of course, the design of the error correction is part of the communication system design and the percent of added information required for error correction can vary over a wide range depending on the requirements of the communication system.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

In describing the present invention, a typical compression scheme and an encoding scheme for improving the compression scheme are described in detail. A JPEG compression scheme is described that is improved by the present invention. However, it is to be understood that the technique of the present invention may be applied to other transform compression schemes including wavelet transform coding, for example. Thus, the disclosed exemplary compression technique and JPEG compression scheme are not to be taken as limiting the scope of the present invention.

Figure 1:
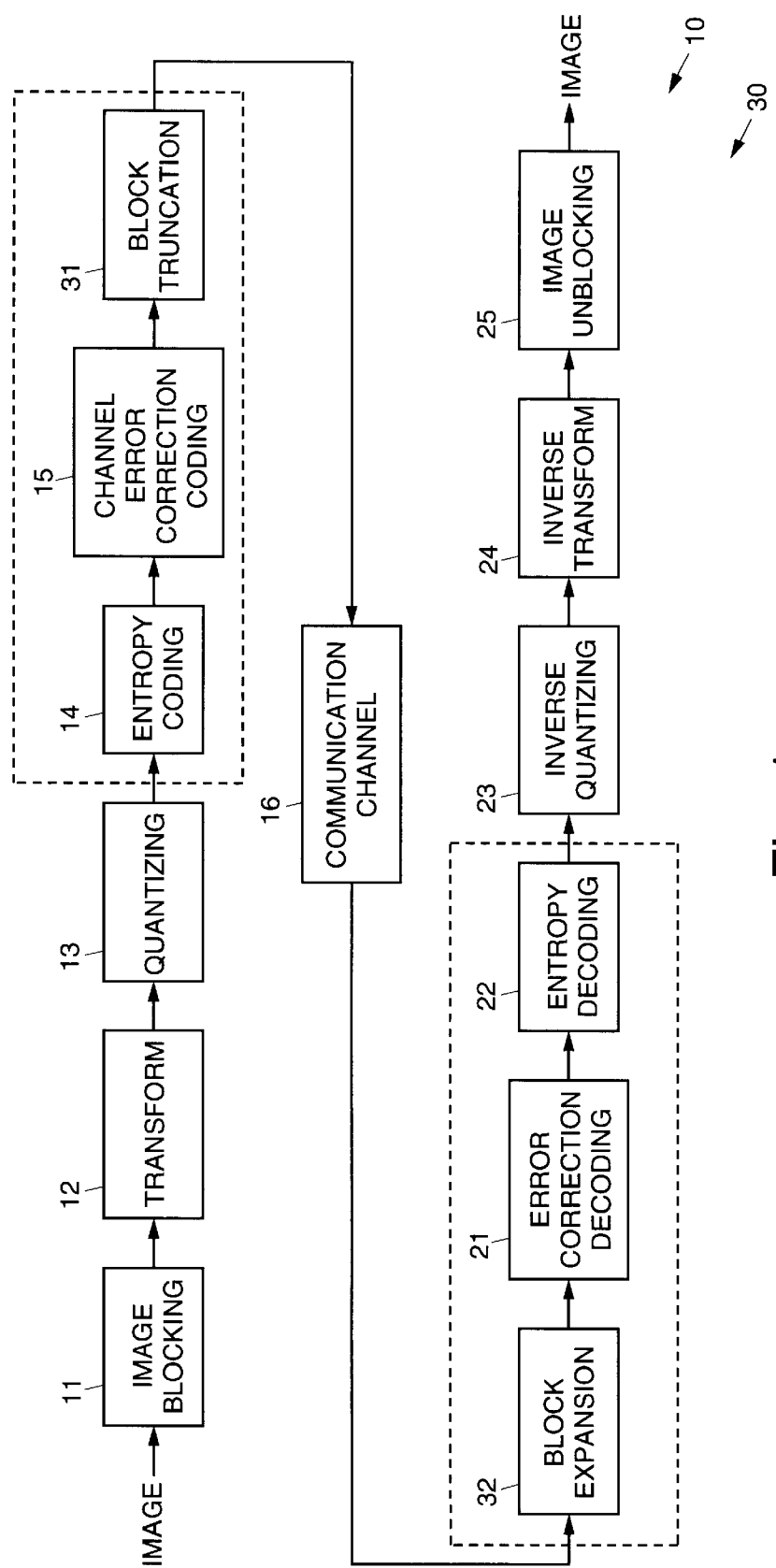
FIG. 1 illustrates an exemplary system and method in accordance with the principles of the present invention that uses error correction coding to improve communication through a communication channel that introduces errors.

Referring to FIG. 1, it illustrates an exemplary image transmission system 10 and method 30 in accordance with the principles of the present invention that uses error correction coding to improve communication through a communication channel 16 that introduces errors. The system 10 and method 30 uses low entropy encoding 14 and error correction coding 15 to improve communication through a communication channel 16 that introduces errors.

More specifically, an exemplary system 10 and exemplary method 30 implements image blocking 11 to process an image to create a plurality of 8×8 pixel blocks. The blocked image is transform coded 12 such as by using a discrete cosine transform followed by a Huffman encoder or arithmetic encoder, for example. The image is then quantized 13 to quantize the transform coefficients.

The image is then entropy coded 14 so that long code words are used for rare image transform values and short code words are used for image transform values that occur often. The image is then error correction coded 15 in accordance with the principles of the present invention which is used to improve communication through the communication channel 16 that introduces errors while at the same time improving the low entropy compression encoding. The entropy coded coefficients are then truncated 31 in accordance with the principles of the present invention to introduce intentional errors into the image that is to be communicated.

Upon reception at the receiving end of the communication channel 16, and in accordance with the principles of the present invention, blocks of the received image are expanded 32 to produce entropy coded coefficients, and the entropy coded coefficients are error correction decoded 21. The error correction decoded entropy coded coefficients are then entropy decoded 22 to produce the quantized transform coefficients. The quantized transform coefficients are then inverse quantized 23 to produce the plurality of transform coefficients. The plurality of transform coefficients are inverse transformed 24 to produce the plurality of image blocks. Finally, the plurality of image blocks are unblocked 25 to produce the transmitted image.

The error correction coding 15 is used to correct errors introduced by the communication channel 16. However, the error correction coding 15 can also correct errors that are intentionally introduced to make the compression more effective. The intentionally introduced errors are an improvement provided by the present invention.

The areas of the image where the entropy is small are those areas where the amount of information is less than one bit per pixel. For a typical transform coding technique, these areas are the parts of the image where there is little high frequency information resulting in large collections of transform coefficients that are quantized to one value, namely "0".

Runs of zeroes in blocks of quantized coefficients may be encoded by using run length coding in the JPEG lossy compression for example. See for example, Pennebaker, et al., JPEG Still Image Data Compression Standard, Van Nostrand Reinhold, N.Y., 1993. A marker code is used to indicate the start of a run of zeroes. The number of zeroes is added behind the marker code. A typical arrangement uses a marker code of five bits followed by a count of five bits. As long as the number of zeroes in the string is greater than 10, it is more efficient to send the run length encoded string than it is to send one bit indicating an entropy encoded zero value. For 8×8 DCT transform coding used in lossy JPEG compression, there are 64 coefficients in one block. When entropy coded, many areas of a large class of images have as many as 40 to 50 coefficients that have quantized coefficients of "0", entropy coded to one bit. Consequently, the compression for the image can be much better than 10:1 that results from using a simple Huffman entropy coding of a 10 bit pixel.

Runs of zeroes may be interrupted by a few transform coefficients where the value of the coefficients is not zero, but is some small value. This interruption of the run of zeroes causes the run length coding to be aborted, several bits of entropy coded coefficients inserted, and another string of zeroes entered. The result is a number of extra bits in the data stream, reducing the compression ratio.

With the use of error correction coding 15 in accordance with the principles of the present invention, the run lengths can be much longer. The intentional errors are introduced by truncating the entropy coded coefficients (block truncation 31). The truncation 31 of the entropy coded coefficients introduces errors that are corrected by the error correction coding 15 of the present invention.

After the channel error correction coding 15 is calculated, the entropy coded coefficients are truncated 31. A selected number of errors may be introduced by the truncation depending on the error correction that is used. For example, if the error correction is able to correct 10 errors, the number of entropy encoded transform coefficients may be truncated to the point where there are 5 bit errors, leaving 5 errors to be introduced by the communication channel 16 before there is an error in the transmitted image. In effect, the last coefficients are made zero, making a longer run of zeroes, until five additional coefficients that were not zero are made zero.

Instead of encoding the run length with a marker code and a number of zeroes, in the present invention, it is more convenient to encode the run length with a number of retained coefficients added as a header number for the block. The number is typically entropy encoded 14 with its own parity for error correction, so that the error correction capability of the block is maintained.

Since the transform coding 12 tends to bunch coefficients that are not zero at the low frequency end of the coefficient set for a block, it is unlikely that there is a run length long enough for run length encoding in the part of the transform 12 before the truncation.

The process of image reconstruction at the other end of the communication channel 16 starts with the decoding 21 of the encoded number of bits in the block. With this information, the block error correction bits are located. The number of bits in the block are then extended with zero bits to match the number of bits that are encoded by the block error correction.

The error correction is applied over the extended block. The error correction corrects errors introduced by the channel 16, and also corrects the errors introduced by truncation.

Once the errors are corrected, decoding 22 of the entropy encoding proceeds. The decoding 22 restores the quantized transform coefficients. The transform coefficients are then restored 23 to their original magnitude by an inverse quantization function 23 implemented as an inverse gain for each coefficient, and transformed back to the image using an inverse transform 24.

An example implementation will filter illustrate the concepts of the present invention. The example is drawn from medical imaging, a chest X-ray. A digital chest X-ray is a 1760 by 2140 12 bit gray scale image. There are a total of 3.8 million pixels and 45.2 million bits required for a raw image. Compression of 10:1 reduces the number of bits per pixel from 12 to 1.2 bits per pixel. The total number of bits is reduced to 4.5 million bits or 560 kilobytes, much less than the 7.5 megabytes required for the raw image stored in a two byte per pixel format.

An accepted compression technique is the JPEG lossy compression standard technique discussed in Pennebaker et al. This technique is an industry standard using an 8×8 cosine transform with Huffman coding for the entropy encoding 14. Run length coding is used in JPEG lossy compression. An acceptable lossy compression ratio is 10:1, established by setting up a quantization table including a quantization level for each coefficient of the 64 coefficients of the transform.

The quantization coefficient is a gain factor for that coefficient. Upon encoding, the coefficient is divided by the gain factor and the result quantized 13 by rounding to the nearest integer. The reconstruction of the image restores the coefficient by multiplying the quantized coefficient by the gain factor for that coefficient. The human eye is less sensitive to noise in the higher frequencies, so the quantization is coarser in the higher frequencies than in the low frequencies. The quantized coefficients are 12 bit numbers, 11 bits of amplitude and one bit of sign.

The energy of the X-ray image is concentrated in the lower frequencies. A typical 8×8 block will have 50% of the image energy in the first 12 coefficients. 75% of the energy is contained in the first 24 coefficients. When the coefficients are entropy encoded 14, most of the bits goes into the first 12 coefficients, a few bits goes into the next 12 coefficients, and the rest of the coefficients are mostly zero, requiring one bit except where there is a little high frequency energy.

For 10:1 compression, the first twelve coefficients require an average of about 5 bits for entropy encoding 14. The second 12 coefficients require an average of about 3 bits for entropy encoding 14. The final 40 coefficients are mostly one bit entropy encoded 14 with an occasional coefficient requiring two or three bits, depending on the high frequency content of the block.

The average number of bits for a block is approximately 140 to 150 before any run length coding is done. The raw number of bits for the block is 768 before compression. The raw compression ratio is approximately 5:1. Run length coding reduced the number of bits allocated to the last block of low entropy coefficients to less than 10 in most situations. The result is a compression ratio close to 10:1 for each block. Averaging over all of the blocks in the image, the compression ratio is 10:1.

The number of bits may be extended to 231 bits by adding zeroes to the end of the string. Since these bits are known and are removed in the following step, appending zeroes costs nothing in terms of transmitted bits. Further, the number of bits in the block varies with the amount of information in the image at that location. The extension to 231 bits allows for blocks that have more information.

A Bose-Chaudhuri-Hocquenghem (BCH) code exists that appends 24 bits for error correction to make 255 bits. This code is discussed in Rorabaugh, C. B., Error Coding Cookbook, McGraw Hill, N.Y., 1996, for example. This code is capable of correcting 12 bits in error. Assigning 6 of those error bits to low entropy encoding 14 leaves 6 bits for error correction for transmission errors. If there is no channel or there is a channel with a very low error rate, the entire 12 bits of error correction may be assigned to low entropy encoding 14.

The string of entropy encoded bits is then truncated. The truncation is accomplished by starting at the end of the 255 bits and moving backward until six bits that are different from zero are encountered. The string is then truncated at that point. The number of bits that remain are counted and the count is added to the front of the string as a header. There are fewer than 231 bits, since 231 bits is the maximum length that can be handled. 231 bits can be counted with 8 bits plus an error correction of three bits for a total of 11 bits for the header.

The result is a bit string that can decoded be easily. The header is always 11 bits. The header is error corrected and used to parse the remaining encoded bits of the block. The number of bits specified in the block header is selected and is expanded by adding zeroes to make 231 bits. The following 24 bits are selected and appended to the stream to make the original 255 bits of the encoded data stream. Error correction is applied, correcting the channel errors and the errors introduced by the truncation process.

The entropy encoding 14 may be reversed with confidence. The coefficients are recovered. The coefficients may be adjusted for the quantization gain for that coefficient and the inverse transform performed to restore the image.

The use of error correction with truncation in the above example adds 11 bits of header plus 24 bits of error correction. The error correction removes all of the trailing zeroes in the entropy encoded bit stream plus at least six more bits when six bits are allocated to the low entropy encoding 14. On the average it has removed two to three times the six additional bits, since there are a number of zeroes in the data stream as well. There are on the order of 40 trailing zeroes before the truncation is performed, leaving approximately 110 bits. If run length encoding is performed, an additional 10 bits are required. The block average encoding is 120 bits. The block average encoding with the error correction is on the order of 78 bits. The improvement is a reduction in the number of bits required for a block by 35%. The compression ratio is improved by 54%.

The disclosed exemplary technique may be used with other forms of compression. An alternative transform that may be used in many applications is a wavelet transform. The wavelet transform separates the image successively into high and low frequency blocks in each of two dimensions.

The exemplary technique using compression with error correction may be readily used with the wavelet compression technique. The result is a set of coefficients for the "high-high" segment of the image that is ¼ of the image. The "high-low" and "low-high" blocks each account for another ¼ of the image. The three blocks together account for ¾ of the coefficients of the image. Further decomposition of the "lowlow" block continues the wavelet transform compression. For the three high frequency blocks, almost all of the coefficients are zero. These large blocks may be segmented into 8×8 blocks and encoded as for the JPEG coding.

To achieve higher compression, larger block sizes are appropriate. If the blocks are 64 by 64 coefficient blocks, the number of coefficients is 4096. Many blocks contain fewer than 12 bits that are not zero when the entropy encoding 14 is completed. The number of bits in the entropy encoded bit stream before truncation is only a few more than 4096, since almost all of the coefficients are zero in the high frequency blocks. The encoding need only correct a few more errors to be able to correct the entire block. On the order of 48 bits with 24 bits of correction capability is able to correct a large number of the 64×64 blocks of high frequency coefficients. The number of bits required is then 12 bits plus three bits of error correction for the header followed by 48 bits of error correction for a total of 60 bits to encode 4096 pixels of the image, 0.015 bits per pixel in that part of the image, corresponding to a 68:1 compression ratio. Of course, the "low-low" area of the image requires more bits, so the overall compression ratio is not 68:1, but is much improved compared to simple wavelet transform with entropy encoding and run length encoding.

Thus, using block error correction in the compression process improves the performance of the compression in the low entropy frequencies in large areas of an image. The error correction may be used to correct channel errors as well as deliberately introduced errors in the compression. The number of bits that can be in error may be allocated to the compression or to channel errors depending on the application. In some applications, all of the errors may be allocated to the low entropy compression, providing further improvements in the compression. In other applications, it may be more appropriate to allocate one half of the allowable errors to the compression and the other half to channel errors.

Figure 2:
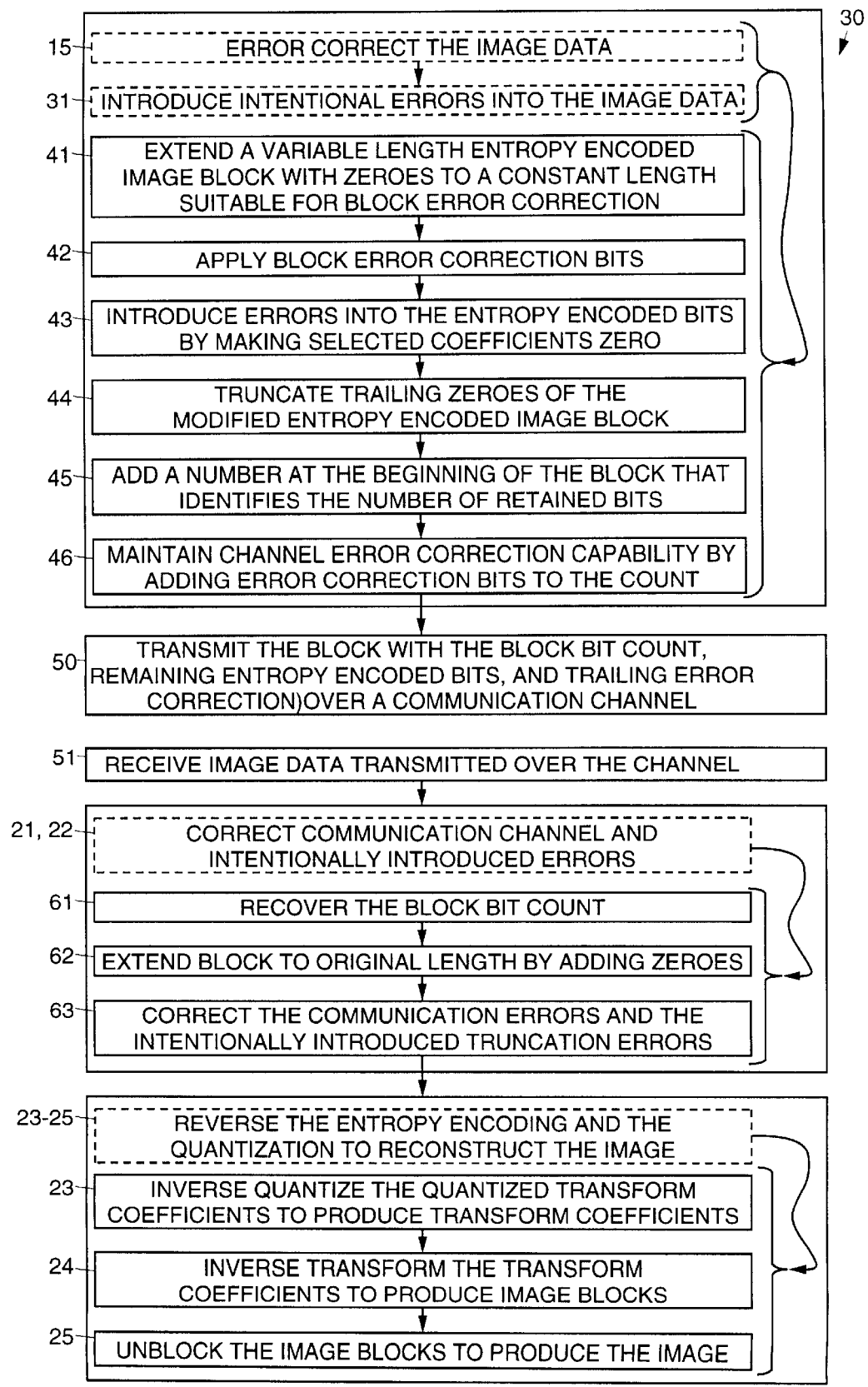
FIG. 2 is a flow diagram that illustrates details of an exemplary method in accordance with the present invention.

Referring now to FIG. 2, it is a flow diagram that illustrates details of an exemplary method 30 in accordance with the present invention that uses the error correction to correct both the communication channel errors and the intentionally introduced errors that improve the compression. The image transmission method 30 comprises the following steps: (1) error correcting 15 the image data; (2) introducing 31 intentional errors into the image data; (3) transmitting 51 the error corrected image data containing the intentional errors over the communication channel; (4) receiving 51 the image data transmitted over the communication channel; (5) correcting 21, 22 the communication channel and the intentionally introduced errors; and (6) reconstructing 23, 24, 25 the image.

The steps of error correcting 15 and introducing intentional errors 31 into the image data comprises: (1) extending 41 a variable length entropy encoded image block with zeroes to a constant length suitable for block error correction; (2) applying 42 the block error correction by generating error correction bits; (3) introducing errors 43 into the entropy encoded bits by making selected coefficients zero; (4) truncating 44 the trailing zeroes of the modified entropy encoded image block; adding a number at the beginning of the block that identifies the number of retained bits so that the truncation can be corrected in a receiver; and (5) maintaining 45 channel error correction capability by adding error correction bits to the count.

The step of transmitting 51 the error corrected image data comprises the step of transmitting 50 the block with the block bit count, the remaining entropy encoded bits, and the trailing error correction.

The step of correcting 21, 22 the errors introduced by the communication channel and the intentionally introduced errors further comprises: (1) recovering 61 the block bit count; (2) extending 62 the block to the original length by adding zeroes; and then (3) correcting 21, 22 the communication errors and the intentionally introduced truncation errors The step of reversing 23, 24, 25 the entropy encoding and the quantization to reconstruct the image comprises; (1) inverse quantizing 23 the quantized transform coefficients to produce a plurality of transform coefficients; (2) inverse transforming 24 the plurality of transform coefficients to produce the plurality of image blocks; and (3) unblocking 25 the plurality of image blocks to produce the transmitted image.

Thus, an image compression system and method that provides for low entropy coding and error-correction of images has been disclosed. It is to be understood that the described embodiment is merely illustrative of some of the many specific embodiments which represent applications of the principles of the present invention. Clearly, numerous and other arrangements can be readily devised by those skilled in the art without departing from the scope of the invention.

What is claimed is:

1. An image transmission system comprising:
   blocking circuitry for processing an image to create a plurality of image blocks;
   transform coding circuitry for processing the image blocks to produce a plurality of transform coefficients;
   quantizing circuitry for quantizing transform coefficients;
   low entropy coding circuitry for entropy coding the quantized transform coefficients;
   error correction coding circuitry for error correction coding the low entropy coded quantized transform coefficients;
   block truncation circuitry for truncating the low entropy coded quantized transform coefficients to introduce intentional errors into the image, which image is transmitted through a communication channel;
   block expansion circuitry for expanding blocks of the received image to produce low entropy coded coefficients;
   error correction decoding circuitry for decoding the low entropy coded quantized transform coefficients;
   low entropy decoding circuitry for decoding the low entropy coded quantized transform coefficients to produce the quantized transform coefficients;
   inverse quantizing circuitry for inverge quantizing the quantized transform coefficients to produce a plurality of transform coefficients;
   inverse transforming circuitry for processing the plurality of transform coefficients to produce the plurality of image blocks; and
   unblocking circuitry for processing the plurality of image blocks to produce the transmitted image.

2. The system recited in claim 1 wherein the transform coding circuitry comprises a discrete cosine transform followed by a Huffman encoder.

3. The system recited in claim 1 wherein the transform coding circuitry comprises a discrete cosine transform followed by an arithmetic encoder.

4. An image transmission method comprising the steps of:
   blocking an image to create a plurality of blocks;
   transform coding the blocked image to produce a plurality of transform coefficients;
   quantizing the transform coefficients;
   low entropy coding the quantized transform coefficients;
   error correction coding the low entropy coded quantized transform coefficients;
   truncating the low entropy coded quantized transform coefficients to introduce intentional errors into the image;
   transmitting the image over a communication channel;
   receiving the image transmitted over a communication channel;
   expanding blocks of the received image to produce low entropy coded quantized transform coefficients;
   error correction decoding the low entropy coded quantized transform coefficients;
   low entropy decoding the low entropy coded quantized transform coefficients to produce the quantized transform coefficients;
   inverse quantizing the quantized transform coefficients to produce a plurality of transform coefficients;
   inverse transforming the plurality of transform coefficients to produce the plurality of image blocks; and
   unblocking the plurality of image blocks to produce the transmitted image.

5. The method recited in claim 4 wherein the step of transform coding comprises the steps of discrete cosine transform coding followed by Huffman coding.

6. The method recited in claim 4 wherein the step of transform coding comprises the steps of discrete cosine transform coding followed by arithmetic coding.

7. An image transmission method for use with a communication channel that introduces errors in image data transmitted over the communication channel, comprising the steps of:
   low entropy coding the image data;
   error correcting the low entropy encoded image data;
   introducing intentional errors into the error corrected image data;
   transmitting the error corrected image data containing the intentional errors over the communication channel;
   receiving the image data transmitted over the communication channel;
   correcting the communication channel and the intentionally introduced errors; and reconstructing the image.

8. The method recited in claim 7 wherein the steps of error correcting and introducing intentional errors into the image data comprises the steps of:

extending a variable length entropy encoded image block with zeroes to a constant length suitable for block error correction;

applying the block error correction by generating error correction bits;

introducing errors into the entropy encoded bits by making selected coefficients zero;

truncating the trailing zeroes of the modified entropy encoded image block;

adding a number at the beginning of the block that identifies the number of retained bits so that the truncation can be corrected in a receiver; and maintaining channel error correction capability by adding error correction bits to the count.

9. The method recited in claim 7 wherein the step of transmitting the error corrected image data comprises the step of:

transmitting the block with the block bit count, the remaining entropy encoded bits, and the trailing error correction.

10. The method recited in claim 7 wherein the steps of correcting the errors introduced by the communication channel and the intentionally introduced errors further comprises the steps of:

recovering the block bit count; and extending the block to the original length by adding zeroes.

11. The method recited in claim 7 wherein the steps of reconstructing the image comprises the steps of:

inverse quantizing the quantized transform coefficients to produce a plurality of transform coefficients;

inverse transforming the plurality of transform coefficients to produce the plurality of image blocks; and unblocking the plurality of image blocks to produce the transmitted image.

* * * * *